United States Patent [19]

Smith

[11] 4,394,055
[45] Jul. 19, 1983

[54] CABINET FOR VIDEO GAME CONSOLES, CARTRIDGES, ACCESSORIES, AND INSTRUCTION BOOKLETS

[76] Inventor: Richard D. Smith, 28640 Vista Madera, San Pedro, Calif. 90732

[21] Appl. No.: 292,352

[22] Filed: Aug. 13, 1981

[51] Int. Cl.³ .................... A47B 47/00; A47B 81/06
[52] U.S. Cl. ...................................... 312/196; 312/9; 312/242; 206/387; 206/814
[58] Field of Search ................. 312/196, 139, 242, 9, 312/12, 22, 21, 23, DIG. 33; 229/2.5 R; 248/DIG. 12, 676, 678, 172, 670; 206/387, 318, 527, 814

[56] References Cited

U.S. PATENT DOCUMENTS

| D. 221,409 | 8/1971 | Gerber | 206/387 |
|---|---|---|---|
| 2,044,559 | 6/1936 | Balster | 312/22 |
| 2,568,783 | 9/1951 | Woodruff | 248/678 |
| 2,639,114 | 5/1953 | Allen | 248/676 |
| 2,845,245 | 7/1958 | Gray et al. | 248/DIG. 12 |
| 3,351,270 | 11/1967 | Hohnjec | 229/2.5 |
| 3,471,947 | 10/1969 | Genser | 312/196 |
| 3,642,239 | 2/1972 | Zeiler, Jr. | 248/DIG. 12 |
| 4,034,908 | 7/1977 | Forbes, Jr. et al. | 206/814 |
| 4,047,774 | 9/1977 | Hanning | 312/196 |
| 4,090,754 | 5/1978 | Kavis | 312/196 |
| 4,117,931 | 10/1978 | Berkman | 206/387 |
| 4,121,877 | 10/1978 | Brown | 206/387 |
| 4,132,311 | 1/1979 | Glinert | 206/387 |
| 4,159,769 | 7/1979 | Hatten et al. | 206/527 |
| 4,215,947 | 8/1980 | Sparling | 248/676 |
| 4,231,473 | 11/1980 | Aprahamian | 206/387 |

FOREIGN PATENT DOCUMENTS

1329551  5/1963  France .................... 312/196

*Primary Examiner*—Victor N. Sakran
*Attorney, Agent, or Firm*—Herzig & Walsh, Inc.

[57] ABSTRACT

A cabinet or container particularly adapted for holding in an organized manner video game consoles of different sizes and shapes and also for holding accessories constructed for use with different systems. The cabinet has a top opening particularly shaped and constructed to receive and accommodate different control consoles or systems such as different Atari control consoles and also a Mattel Intellevision control console. Typically the dimensions of the control consoles vary and typically they have a base part of different dimensions. The open top of the cabinet is particularly configured to receive and accommodate the different consoles. The base part of a control console can extend down through the opening. The console may be supported on peripheral surfaces of the opening itself or on ledges extending inwardly with respect to the opening at a level below the surface of the top. The lower part of the cabinet is preferably compartmentalized uniquely to hold different cartridges. Compartments are formed with means adapted to receive different sizes of cartridges.

10 Claims, 8 Drawing Figures

CABINET FOR VIDEO GAME CONSOLES, CARTRIDGES, ACCESSORIES, AND INSTRUCTION BOOKLETS

BACKGROUND OF THE INVENTION

1. Field of the Invention

The field of the invention is broadly that of storage containers, holders or cabinets, but more especially, the field of the invention is that of a particularized storage cabinet or container adapted for suitably holding and storing video game consoles of various types and size and for also containing and storing cartridges and equipments for use with the games. The invention is particularly adapted for, but not limited to, use with Atari and or Mattel Intellevision consoles, cartridges, accessories, and instruction materials.

2. Description of the Prior Art

The utilization of video games has become extremely wide-spread in connection with television sets and amusement devices having a screen on which types of video games can be played in response to controls. Such video game consoles, cartridges, and accessories and avilable in various sizes, two of the popular sizes being identified in the foregoing, that is, Atari and Intellevision consoles.

Because of the console configuration and expense, quantity of cartridges available and varying shape, numerous accessories and instruction booklets needed for play, the problem of maintaining video games and equipment and storage of them in such a way as to make possible the handy retrieval and utilization of any particular component has become an intensive one. Typically, the utilization of the games, such as, for example, with a television set, requires the need of other equipment including a particular control console and the manipulatable components necessary for playing a game. Thus, an intensive need exists for a container or cabinet capable of holding all the needed components for operating and playing a game in such a way that the components are kept or held in an organized way readily available for easy retrieval of an individual cartridge, as well as providing a ready access to the control console needed and the manipulatable control components and game instruction booklets. Preferably a dust cover is provided for the cabinet because of the unit being near television and other entertainment accessories.

There are different control consoles presently available including two Atari styles and the Intellivision style. Because of differences in their shapes a problem has been presented in the availability of a holding cabinet that will accommodate the different shapes.

The particular need identified in the foregoing has not adequately been filled in the prior art, particularly in the sense that a cabinet or a holder has not been available having the needed characteristics as identified in the foregoing, and further not having the characteristics of providing for console storage, accessory storage, and providing cartridge and instruction booklet storage areas.

The herein invention meets the needs identified in the foregoing and fulfills the deficiencies in the prior art as elucidated, a preferred exemplary form of the invention being described in detail hereinafter.

SUMMARY OF THE INVENTION

In a preferred exemplary form of the invention, it takes the form of a cabinet or container having a particular construction which includes an upper or top part particularly constructed to hold and accommodate various control housings or control consoles utilized for playing video games and a section for holding different sizes of video cartridges in an organized manner. The lower section of the container is provided with transverse upstanding partial partitions and ribs configurated to form compartments to receive cartridges of different sizes so that they are held in an organized but readily accessible manner. The lower section is further constructed to provide a holder for the manipulatable control components of the game and instruction booklets.

Preferably the cabinet or container has an open top or has an opening in the top with support ledges provided in such a way that a plurality of types of control consoles or modules for the game system can be held in the cabinet in the top opening and on the ledges in a position over the cartridges. All necessary wiring can be held in the lower section of the container as well. Preferably, a transparent dust cover is provided which fits over and rests on the lower section of the container to provide a pleasing, decorative appearance which is further dust free.

From the foregoing, those skilled in the art will readily recognize the need that is filled by the invention as identified in the foregoing, the primary object of the invention being to fill the need in an adequate, efficient, decorative, and economical way and in a maner characterized by great utility.

A further object of the invention is to achieve and realize a container or a cabinet particularly adapted for holding and organizing different sizes of video game consoles and cartridges and the like in a manner whereby they are positioned uniformly and held in a way providing for easy access to individual cartridges.

A further object is to realize a product as in the foregoing which is constructed to have a lower section for the holding the cartridges as described and further provided with an opening in the top, and the ledge means constructed for holding and accommodating various types and forms of control consoles or modules for playing the video games.

A further object is to realize a construction having an unique design whereby to realize the purpose of organizing and maintaining all of the parts and the components, particularly control consoles, cartridges, accessories, and instruction booklets, utilized in the play of video games.

Further objects and advantages of the invention will become apparent from the following detailed description and annexed drawings.

DESCRIPTION OF THE PREFERRED EMBODIMENT AND BEST MODE OF PRACTICE OF THE INVENTION

FIGS. 1, 2, 3, 4, and 8 illustrate a preferred form of the invention. The invention in this form is a cabinet having a holder or container part 10, the top of which is flat, but having a rectilinear opening in it, as designated at 12, in FIG. 1 having a shape as shown and which will be referred to again presently.

Figure 2:
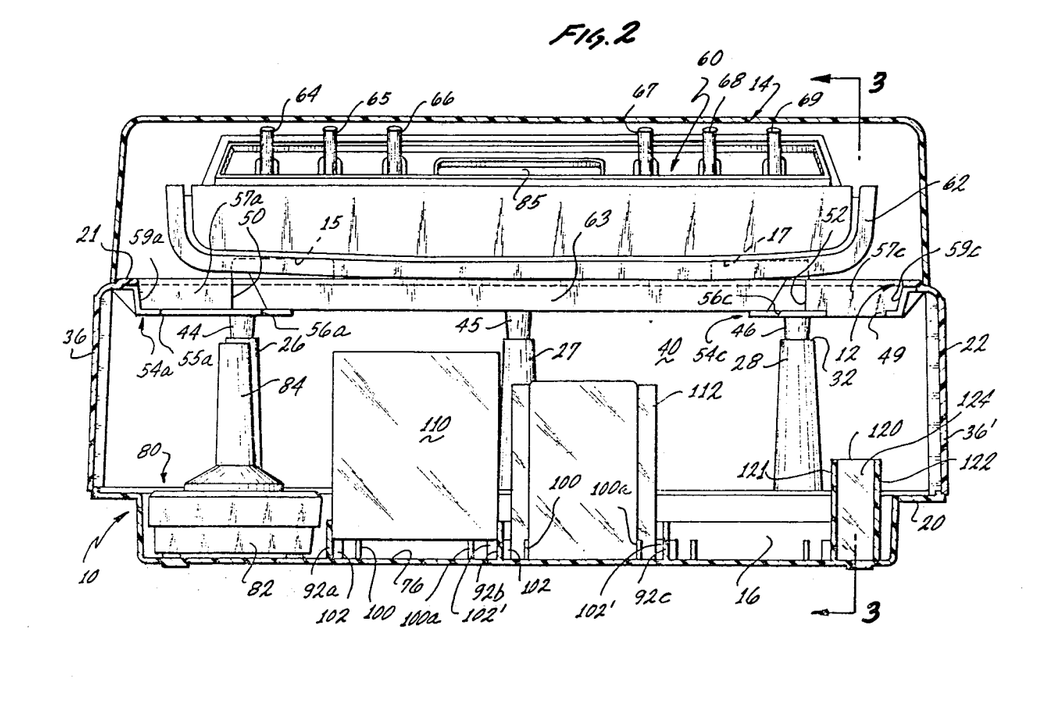
FIG. 2 is a sectional view of the form of the invention shown in FIG. 1, illustrating one type of control console within the transparent top cover.
Figure 3:
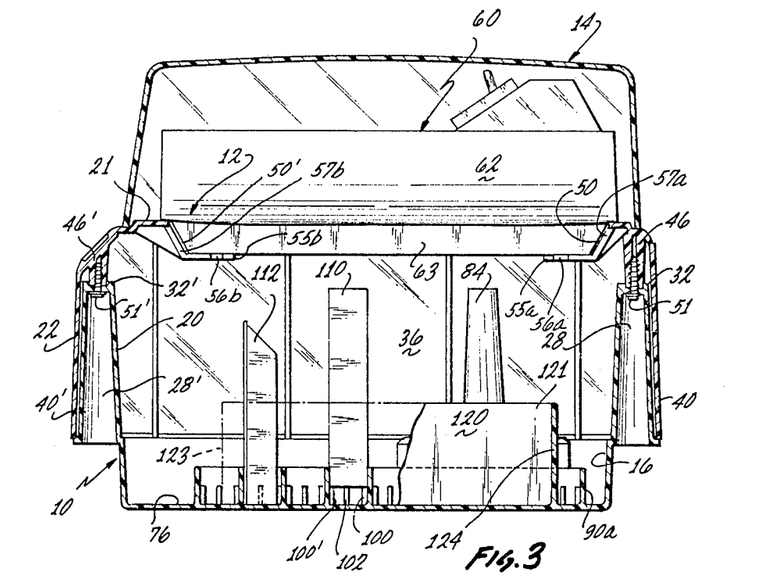
FIG. 3 is a sectional view taken along the line 3—3 of FIG. 2.

The general shape of the lower portion 10 of the cabinet may be observed from the sectional views, FIGS. 2 and 3. Numeral 14 designates a transparent rectilinear dust cover, the lower edges of which rest on top surfaces of the section 10, as will be referred to more in detail presently. In has cutouts or air openings 15 and 17 as shown in FIG. 2.

The bottom part of the section 10 is designated by the numeral 16, as may be seen in FIGS. 2 and 3. It has lesser width than the main part of the lower section 10, as may be seen in FIG. 2.

Particular configurations of partial partitions are provided on the inside surface of the bottom part 16 for the purpose of holding cartridges, as will be referred to more in detail presently.

The lower section 10 is formed in two parts or portions including a portion as designated at 20 FIG. 3 and an upper and outer or top portion as designated at 22. These parts are designed to facilitate their fabrication from material, such as plastic, and to facilitate assembly of the parts, as will appear hereinafter. Part 22 has a top surface 21 around opening 12 which has narrowed end parts and an intermediate part of larger dimension.

The bottom part 16 is part of the section or portion 20. At the front and back of the section 20, there are provided tubular strut members, as best may be seen at 26, 27, and 28 in FIG. 2 showing the struts at the back and in FIG. 3. These strut members are hollow and of cone shape as shown. As shown, the strut member 28 has a top 32, and the strut member 28' has a top 32'. See FIG. 3. The numerals for the struts at the front are primed.

The section 10 has end walls, as designated at 36 and 36'. See FIG. 2.

The upper or top part 22 having surface 21 of the section 10 of the cabinet has the rectilinear opening 12 in it as previously described. Part 22 has front and back walls, as designated at 40' and 40, which form skirts that extend down over the outside of the strut 28' at the front (and others not shown) and struts 26, 27, and 28 at the back. One or more similar strut members (not shown) can be provided at each end of the cabinet.

Figure 1:
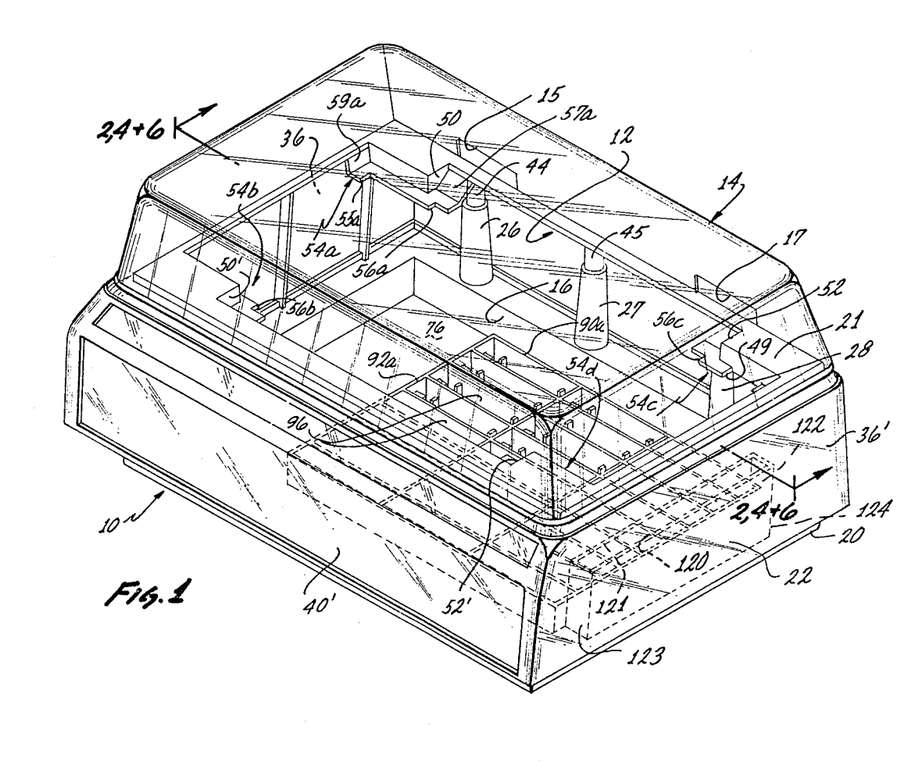
FIG. 1 is an isometric view of a preferred form of cartridge cabinet without the control console but with a transparent top cover, the cabinet of this figure being common to all of the forms of the invention.

As may be seen in FIG. 1, at the back of the upper portion 22 extending downwardly from the top are cylindrical posts 44, 45, and 46 which are integral with the top 22 and which extend downwardly into alignment with the tops of the struts 26, 27, and 28. On the front side of the upper portion 22 extending downwardly from the top are a similarly set of posts, one of which may be seen at 46' in FIG. 3, these posts similarly extending down to the tops of the corresponding tubular struts at the front, one of which is shown at 28'. As may be seen in FIG. 3, the post 46 is attached to the top 32 of the strut 28 by means of a screw 50. All of the posts, as described, are similarly secured to the tubular struts already described, at the back and front of the cabinet. Similar posts would be provided for additional strut members as referred to above.

As previously described, numeral 12 designates the opening in the top surface 21 of the upper portion 22. The ends of the opening are narrower than the intermediate portions of the opening so that the square shoulders are provided between the narrower and wider portions, as designated at 50 and 50' and 52 and 52'. See FIG. 1.

Adjacent the position of the square shoulder 50, there is a ledge construction which is designated by the character 54a which extends inwardly from the under surface of the top 21 adjacent to the shoulder 50 as shown, the ledge extending from an end of the opening 12 to a position beyond (inward of) the shoulder 50 and having at its inner edges cut-outs forming square shoulders designated at 55a and 56a. At the inner edge of ledge 54a is a slant surface 57a and at the outer end is a slant surface 59a. Adjacent each corner of the opening 12 of the top surface 21, similar square shoulders are provided in the opening and similar ledge constructions which are identified by similar characters including the letters b, c, and d. At the right end of the cabinet the ledges are interrupted as shown at 49 to accommodate access to a booklet compartment 120 as will be described.

The purpose of the particular shape of the opening 12, the shoulders 50, and the ledges 54, 55, and 56 at the corners is to accommodate, that is, to support, different types of control consoles, cartridges, and control accessories which are attached to the console in order to play the particular video game.

FIG. 1 shows the cabinet with the transparent cover 14 on the lower section without a control console or component within it.

FIG. 2 shows a particular control console or component within the transparent housing 14, as designated generally by the numeral 60. As shown, the console or component is an original form of an Atari control housing. It has a part as shown at 62 with upwardly curving ends and a base part of smaller dimensions 63 which rests on end parts of ledges 54a, 54b, 54c, and 54d of the top 12 of the upper portion 22 of the cabinet.

The console 60 has manipulatable handle members, as designated at 64, 65, 66, 67, 68, and 69. This component itself does not form a part of the invention, and since it is a commercial unit, it need not be described in further detail. It is noted however that the internal construction of opening 12 serves to accommodate it, FIG. 3. Base 63 has slanting sides and ends. As seen in FIG. 3 the slanting sides are accomodated by slanting surfaces 57a and 57b.

Reference is again made to the bottom part 16 of the lower section 20, particularly as shown in FIGS. 2 and 3. The bottom wall itself is designated by the numeral 76. At one end of the bottom part 16 is positioned the component 80 which has a base part 82 and an upstanding manipulatable control handle or lever 84. This component is connected by wiring as necessary to the control console or component 60 and to the instrument, such as a television set having a screen on which the play of the video game is observed. Lever 84 is exemplary of one type of control member. The cartridge is inserted into slot 85. The control unit connects by plug-in wiring to the console.

Figure 8:
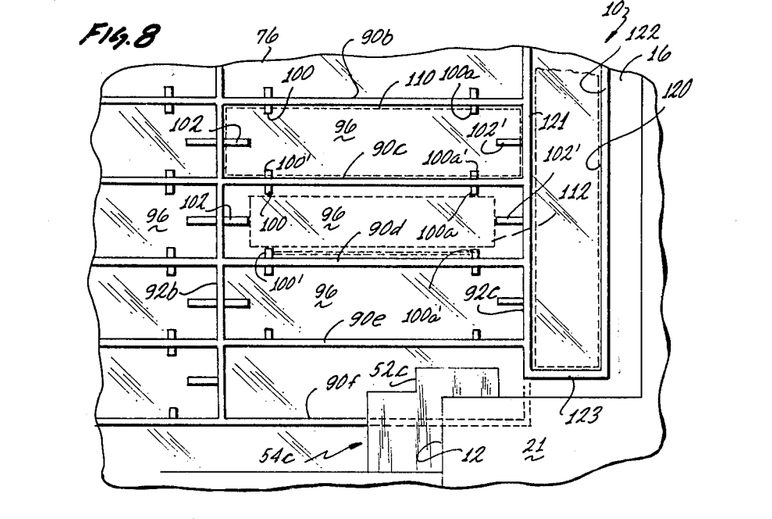
FIG. 8 is a partial plan view showing the construction at the bottom of the cabinet of FIG. 1.

FIG. 8 is an enlarged plan view of a section of the bottom 76 of the lower part 16. Partial partition members are provided in a configuration providing compartments to receive the lower ends of cartridges of different sizes, as will be explained. As may be seen in FIG. 1, members are provided upstanding from the bottom wall 76 of the portion 16 forming a compartmentalized area, these partition members including members 90a and 92a which are part of a rectilinear compartmentalized area. See FIG. 1. Partial partition members similar to and parallel to the member 90a are shown at 90b, 90c, 90d, 90e and 90f in FIG. 8. Partial partition members parallel to the member 92a are shown at 92b and 92c in FIG. 8. Referring to FIG. 8, the partial partition members 90b; 92b; 90c; and 92c, form a rectangular compartment which is identified by the numeral 96. This compartment is of a size to snugly receive the lower end of a particular cartridge such as Atari cartridge 110, FIG. 2.

Referring to the partition member 90b, numerals 100 and 100a designate inwardly extending rib members which are spaced from the partition members 92b and 92c as shown and which are of less height than the partition members 90b and 90c, as may be seen in FIGS. 1 and 3. Similar rib members are provided in the partition member 90c, as designated at 100' and 100a'. The shorter rib members, as just described, extend to both sides of the partition 90b and the partition 90c.

Rib members, similar to those just described, are provided extending from the partition member 92b and 92c, as designated at 102 and 102'.

From the foregoing, it will be understood that the compartment 96 which is of limited height is of the shape to receive the bottom end of a cartridge which may be an Atari video cartridge, as designated in 110 in FIG. 2. Its lower end fits into the compartment 96, and its bottom rests on the rib members of limited height, as designated at 100, 100', 100a, 100a', 102, and 102'.

Numeral 112 designates a video cartridge of another size, that is, a smaller size, which may be an Intellevision cartridge, for example. The rib members of shorter height, as designated at 100, 100', 100a, 100a', 102, and 102' of FIG. 8 between them form or define a space of a size which receives the lower end of the cartridge 112, as shown in FIGS. 2 and 3. Thus, in this manner, as can be seen, the lower ends of multiple cartridges of different sizes are snugly received in the configurations, that is, the compartmentalized areas within the bottom 16 of the cabinet to be snugly held in an uniform organized and easily retrievable relationship since the upper parts of these cartridges can be readily grasped for removal.

A plurality of the holding compartments similar to those described is provided by the partition members and rib members as described, and illustrated in the figures.

Numeral 120 designates a rectangular compartment of limited height having sidewalls 121 and 122 and end walls 123 and 124, this compartment being suitable for holding instruction booklets and pamphlets and similar material.

As may be seen in FIG. 3, the control console or component 60 rests on the ledges, as previously described and identified by the characters 54a, 54b, 54c, and 54d.

The upper or top section or portion 22 of the cabinet with opening 12 and the ledges is constructed so as to accommodate the capability of holding or containing different types of control consoles or components, such as particularly, by way of example, the original and new Atari control console and the Mattel Intellevision control console.

FIG. 2 as previously described illustrates how the control console 60 is accommodated in the top 22 of the cabinet. The control console shown in FIG. 2 is the original Atari control housing which is accommodated by the top 22 in the opening 12 as shown. The control console has a base part 63 of smaller size than the main part of the control console which fits down through the opening 12 adjacent to the shoulders 50, 50', 52, and 52' this base portion resting on the inner ends of ledges 54a, 54b, 54c, and 54d at a position adjacent to the cut-outs or square shoulders 56a, 56b, 56c, and 56d. Base part 63 has slanting sides and ends.

FIG. 3 is a cross sectional view showing how the base part 63 is accommodated by the inner part of the ledges 54a, 54b, 54c, and 54d adjacent to their inner ends the slanting side surfaces of the base part 63 being contiguous to the slanted parts 57a, 57b, 57c, and 57d of the ledges.

Figure 4:
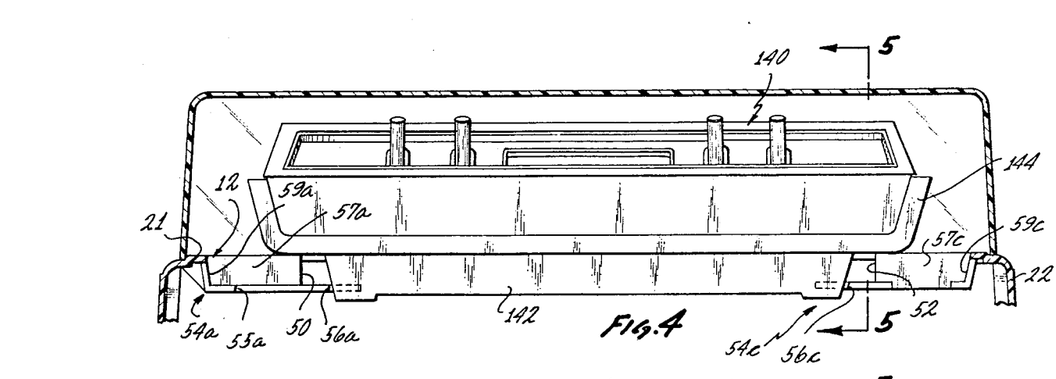
FIG. 4 is a partial sectional view showing another form of control console within the top cover or housing of the assembly.
Figure 5:
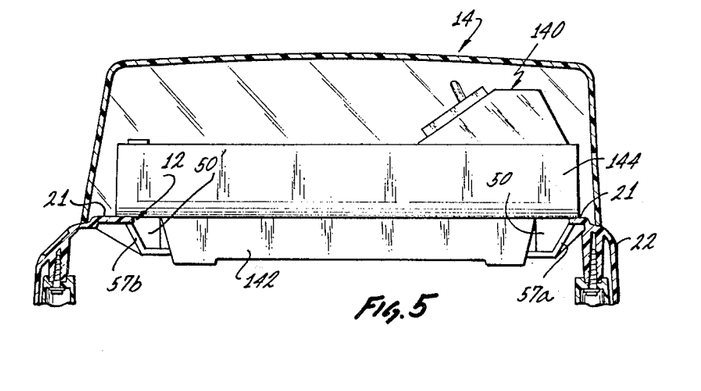
FIG. 5 is a cross sectional view taken along the line 5—5 of FIG. 4 showing the control console resting on the cartridge cabinet within the transparent top cover.

FIGS. 4 and 5 are cross sectional views of another form of control console which is a later form of Atari control console the shape of which is modified from that of FIGS. 2 and 3. This control console is designated by the numeral 140 having an extending bottom part 142 of different dimensions as shown. The bottom portion 142 is received in the opening 12 of the top 22 as shown adjacent to the shoulders 50, 50', 52, and 52'. The upper portion of the module 140 as designated by the numeral 144 is of larger dimension so that both its sides and ends can rest directly on parts of surface 21 of the top 22 as may be seen in FIGS. 4 and 5 with the bottom or base portion 142 extending through the opening 12, the portion 142 extending below the ledges 54a, 54b, 54c, and 54d and being accommodated by the cut-outs at the positions of the square shoulders 56a, 56b, 56c, and 56d. Control console 140 is shown having four control handles but it might have six as in FIG. 2.

Figure 6:
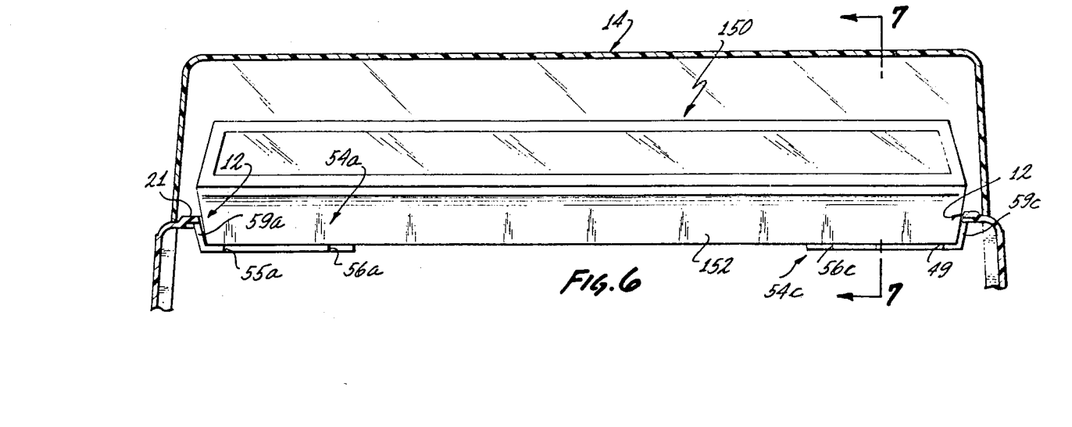
FIG. 6 is a view illustrating another type of control console resting on the cartridge cabinet within the transparent top cover.
Figure 7:
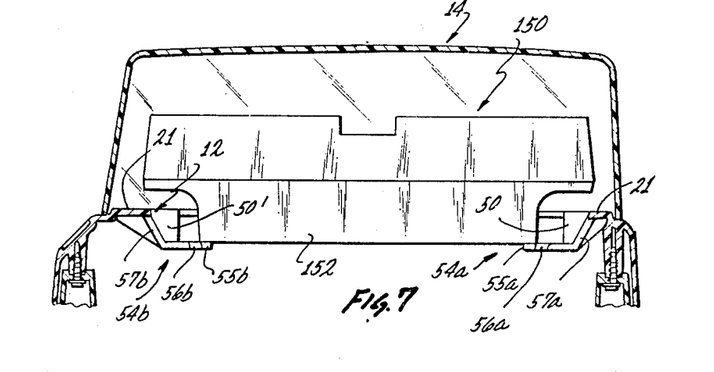
FIG. 7 is a sectional view taken along the line 7—7 of FIG. 6 showing the base of the control console resting on the ledges in the cartridge cabinet with the transparent top cover.

FIGS. 6 and 7 are cross sectional view which illustrate of the cabinet accommodates receiving and holding another control console which in this instance is the contemporary Mattel Intellevision console. The console is designated at 150 in these figures and as may be seen in FIGS. 6 and 7 its lower portion 152 is longer and narrower. The opening 12 accommodates it by permitting the opening 12 in the top 22. The bottom portion of the control console 150 as designated at 152 is narrower and as may be seen in FIG. 6 it is accommodated by being received on the ledges 54a, 54b, 54c, and 54d. Its ends have a slant which are accommodated by slant surfaces 59a, 59b, 59c, and 59d.

From the foregoing, those skilled in the art will readily understand the nature and construction of the invention and the manner in which it achieves and realizes the objectives set forth in the foregoing.

The present disclosure is representative of preferred forms of the invention and is to be interpreted in an illustrative rather than a limiting sense the invention to be accorded the full scope of the claims appended hereto.

I claim:

1. As an article of manufacture a cabinet for holding video game playing equipment including control consoles and accessories, said cabinet having a top having an opening in it, the periphery of the opening being constructed to provide supporting surfaces for accommodating a plurality of different control consoles having varying configurations, said opening having portions whereby to provide support surfaces and means forming additional support surfaces at said opening which are positioned whereby the said support surfaces can accommodate control consoles having a base portion of smaller dimensions which can extend through said opening to be supported on said additional surfaces, the said cabinet having a lower section constructed for holding accessories, said opening has portions of different width than other portions, said other portions being constructed to accommodate a control console having a base part of a size to be accommodated to be received in the said opening at the position of said other portions, said opening includes inwardly extending ledges having portions extending inwardly from the ends of the said opening, to accommodate a console having a base part extending into the opening, said opening has narrower end portions which form shoulders in the said top between the opening portions, the said ledges including portions extending inwardly from said shoulders, providing a rectangular configuration to receive and hold a narrower base portion of another console.

2. An article as in claim 1 wherein said ledges include a slanting portion extending between the ledge and the top of said first opening at the end, to accommodate base part of a console having slanting sides.

3. An article as in claim 2 wherein said ledges include a slanting surface extending from an edge of the ledge beyond the shoulder to the top edge of the said first opening.

4. An article as in claim 1 wherein each of said ledges has a flat portion parallel to an end of the said first opening and a flat portion parallel to a side of an end part of the first opening.

5. As an article of manufacture a cabinet for holding video game playing equipment including control consoles and accessories, said cabinet having a top having an opening in it, the periphery of the opening being constructed to provide supporting surfaces for accommodating a plurality of different control consoles having varying configurations, said opening having portions whereby to provide support surfaces and means forming additional support surfaces at said opening which are positioned whereby the said support surfaces can accommodate control consoles having a base portion of smaller dimensions which can extend through said opening to be supported on said additional surfaces, the said cabinet having a lower section constructed for holding accessories said opening includes inwardly extending ledges having portions extending inwardly from the ends of the said opening and portions extending inwardly from sides of the said opening, to accommodate a console having a base part entending into the opening each of said ledges has a flat portion parallel to an end of the said opening and a flat portion parallel to a side of an end part of the opening, each of said ledges has a cut-out at an inner end thereof to accommodate a control console having a base part of a smaller size so that the base part can extend down through said cut-outs in the ledges.

6. As an article of manufacture, a cabinet for holding video game playing equipment including a control console the said cabinet having a lower section constructed for holding cartridges, said cabinet having a top having an opening in it, the periphery of the opening being constructed to provide supporting surfaces for accommodating a plurality of different control consoles having varying configurations, said opening being shaped to accommodate supporting control consoles which have a main part having a bottom surface and a base part having a bottom surface the base part having smaller dimensions than the main part, the said opening having a shape to allow the base part of a control console to extend through it and the periphery of said opening including means to provide support for at least one of said surfaces including ledge members extending inwardly from the said top opening at a level below the surface of the top in a position to accommodate supporting the said base part of said control component said inwardly extending ledge members have at least one cut-out therein whereby to accommodate having the base part of a control console extend downwardly through the cut-out and below the level of the ledge means.

7. An article of manufacture as in claim 6 said ledge members having a construction to accommodate control consoles wherein the base part of the component has slanting side surfaces, the said ledge means including slanted surface means extending from the ledge means to the upper edge of the opening in the top, the said slanted surfaces having a slant to accommodate contiguous engagement with portions of slanted sides of the base part of the control module.

8. As an article of manufacture, a cabinet constructed for holding video game playing equipment including any one of a plurality of control consoles and accessories, the consoles including one having a generally rectangular main part and an extending base part which is shorter and narrower then the main part and at least one other console having an extending base part which is substantially as long as the main part, but narrower than the main part, the improvements comprising said cabinet having a an upper part having a first flat surface portions having a rectangular configuration of a size to receive and hold the base part of at least one of said consoles, the said flat surface portions having surfaces to support the base of the console with the main part of the console overhanging the said flat surface portions, additional flat surface portions in the cabinet providing a rectangular configuration to receive and hold at least one end of the base part of the said other console having a base part which is substantially as long as and narrower then the main part of the console, said additional support surfaces being constructed to retain sides of the base part of the console with the main part of the console positioned in the operating position above the said first flat surfaces of the cabinet.

9. An article as in claim 8, wherein said first support surfaces includes side and end members which hold and restrain the base of the one console with respect to lateral movement, the said additional supporting surfaces including members engageable with the base of the other console to restrain it against lateral movement either to the right or left, forward and backwards.

10. As an article of manufacture a cabinet constructed for holding video game playing equipment including any one of a plurality of control consoles and accessories, the consoles including one having a generally rectangular main part and an extending base part which is shorter and narrower then the main part, and at least one other console having an extending base part which has portions extending deeper than the base part of the one console, the improvements comprising said cabinet having an upper top part having flat surface portions, said top part having a recess in it having a rectangular configuration of a size to receive the base part of either of said consoles, the said recess having ledges providing bottom portions to support the base of the one console with the main part of the console positioned in operating position above the top flat portions with parts overhanging the recess; the ledges extending inwardly from sides and ends of the recess the said recess being shaped to receive and hold the base part of the said other console, said ledges having cut outs whereby the said portions of the other console can protrude past the ledges, said recess and ledges being constructed to retain sides of the base part of the consoles with the main part positioned in operating position above the said top flat surfaces of the cabinet.

* * * * *